S. SPELMAN.
Supplementary Wheels for Car-Trucks.
No. 138,949. Patented May 13, 1873.
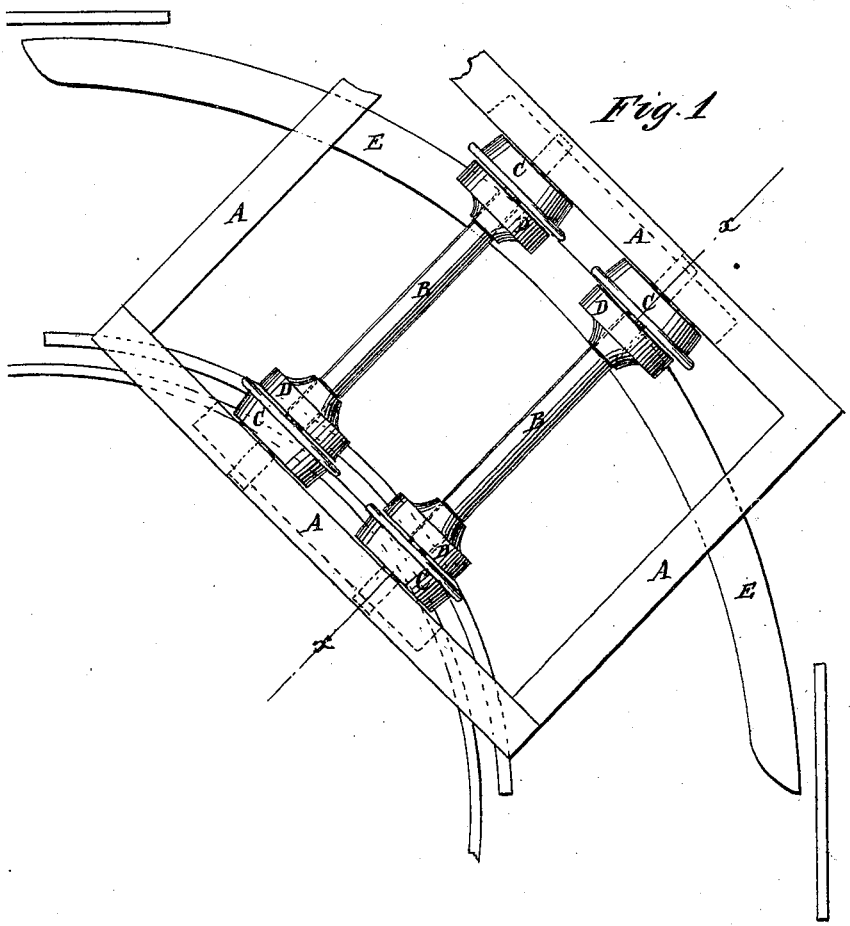
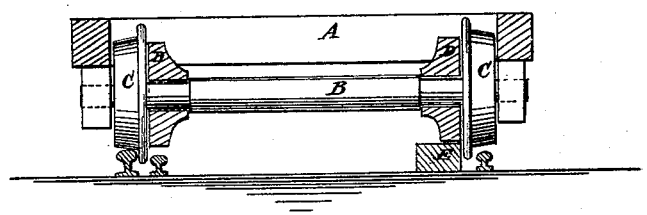

UNITED STATES PATENT OFFICE.

SMITH SPELMAN, OF BROOKLYN, NEW YORK.

IMPROVEMENT IN SUPPLEMENTARY WHEELS FOR CAR-TRUCKS.

Specification forming part of Letters Patent No. 138,949, dated May 13, 1873; application filed February 21, 1873.

*To all whom it may concern:*

Be it known that I, SMITH SPELMAN, of Brooklyn, in the county of Kings and State of New York, have invented a new and useful Improvement in Supplementary Wheels for Car-Trucks, of which the following is a specification:

Figure 1 is a top view of a car-truck to which my improvement has been applied. Fig. 2 is a detail cross-section of the same taken through the line $x\ x$, Fig. 1.

Similar letters of reference indicate corresponding parts.

My invention has for its object to diminish the friction and consequent wear of car-wheels in passing around curves. The invention consists in applying supplementary wheels to run loose on the axle of the ordinary flanged wheels. It is especially applicable on street railways, a wide flat rail being provided for the supplementary wheels to run on, as hereinafter described.

A represents a truck-frame, with which the axles B are connected in the ordinary manner. C are the ordinary wheels, which are rigidly connected with the axles B, so as to carry the said axles B with them in their revolution. D are supplementary or independent wheels, which revolve loosely upon journals formed upon the axles B at the inner sides of the wheels C. Upon the inner side of the outer rail of the track at a curve is secured a plate, E, which should be a little higher than said outer rail. When the car is passing around a curve, the supplementary wheels D, upon the outer side of the curve, come in contact with and roll along the plate E, which raises the outer truck-wheels clear of the rail, so that they revolve without friction, the wheels D supporting the outer side of the car, and turning more rapidly than the truck-wheels C. By this means the sliding and grinding friction of the wheels in passing around a curve is entirely done away with.

Having thus described my invention, I claim as new and desire to secure by Letters Patent—

In a car-truck, the axle B, carrying the fixed wheels C C, in combination with the independent wheels D D, arranged to operate substantially as herein shown, and for the purpose described.

SMITH SPELMAN.

Witnesses:
JAMES T. GRAHAM,
T. B. MOSHER.